US010841251B1

(12) United States Patent
Ramachandran et al.

(10) Patent No.: US 10,841,251 B1
(45) Date of Patent: Nov. 17, 2020

(54) MULTI-DOMAIN CHATBOT

(71) Applicant: MOVEWORKS, INC., Mountain View, CA (US)

(72) Inventors: Mukund Ramachandran, Sunnyvale, CA (US); Desmond Wing-Yin Chan, Saratoga, CA (US); Nick Naixuan Guo, Mountain View, CA (US); Jing Chen, Redwood City, CA (US); Jiang Chen, Fremont, CA (US); Vaibhav Nivargi, Palo Alto, CA (US); Varun Singh, Mountain View, CA (US); Bhavin Nicholas Shah, Fremont, CA (US)

(73) Assignee: MOVEWORKS, INC., Mountain View, CA (US)

( * ) Notice: Subject to any disclaimer, the term of this patent is extended or adjusted under 35 U.S.C. 154(b) by 0 days.

(21) Appl. No.: 16/787,920

(22) Filed: Feb. 11, 2020

(51) Int. Cl.
*H04L 12/58* (2006.01)
*G06F 40/30* (2020.01)

(52) U.S. Cl.
CPC .............. *H04L 51/02* (2013.01); *G06F 40/30* (2020.01); *H04L 51/14* (2013.01)

(58) Field of Classification Search
CPC .......... H04L 51/02; H04L 51/14; G06F 40/30
See application file for complete search history.

(56) References Cited

U.S. PATENT DOCUMENTS 6,259,969 B1 * 7/2001 Tackett .................. G06N 3/006
700/264

6,604,090 B1 * 8/2003 Tackett .................. G06N 20/00
706/11

(Continued)

FOREIGN PATENT DOCUMENTS

EP 3392781 A1 * 10/2018 ............... G06N 3/08
GB 201808772 * 7/2018 ............. H04L 51/02
(Continued)

OTHER PUBLICATIONS

"How intent classification works in NLU", Botfront.io Blog, retrieved Feb. 4, 2020 from: https://botfront.io/blog/how-intent-classification-works-in-nlu, 8 pages.

(Continued)

*Primary Examiner* — Kostas J Katsikis
(74) *Attorney, Agent, or Firm* — Ascenda Law Group, PC

(57) ABSTRACT

A multi-domain chatbot is used to service a message of a user. An automated agent of the multi-domain chatbot may act as an intermediary between the user and a plurality of domain-specific modules of the multi-domain chatbot. The automated agent may receive the message from the user, determine an intent of the message, and based on the intent, determine a group of the domain-specific modules that should be investigated. The automated agent may then investigate the group of domain-specific modules by sending the user message to and receiving responses from the domain-specific modules within the group. Based on the received responses, the automated agent may determine whether to provide, to the user, one of the domain-specific responses or a null response, in the event that none of the domain-specific responses is aligned with the intent of the message.

19 Claims, 6 Drawing Sheets

(56) References Cited

U.S. PATENT DOCUMENTS

| | | | | |
|---|---|---|---|---|
| 6,629,087 | B1* | 9/2003 | Benson | G06F 40/232 706/11 |
| 8,346,563 | B1* | 1/2013 | Hjelm | G10L 15/1822 704/275 |
| 8,700,005 | B1* | 4/2014 | Kiraly | G06F 16/31 455/412.2 |
| 8,954,444 | B1* | 2/2015 | Retzlaff, II | G06F 16/319 707/741 |
| 9,189,742 | B2* | 11/2015 | London | G06Q 30/0613 |
| 9,552,350 | B2* | 1/2017 | Brown | G10L 17/22 |
| 9,836,452 | B2 | 12/2017 | Robichaud et al. | |
| 10,331,791 | B2* | 6/2019 | Anbazhagan | G06F 40/35 |
| 10,403,283 | B1* | 9/2019 | Schramm | H04M 3/42212 |
| 10,417,266 | B2* | 9/2019 | Patel | G06F 40/274 |
| 10,452,782 | B1* | 10/2019 | Kumar | G06F 40/295 |
| 10,460,728 | B2* | 10/2019 | Anbazhagan | G06F 3/167 |
| 10,498,883 | B1* | 12/2019 | Krebs | G10L 15/26 |
| 10,554,817 | B1* | 2/2020 | Sullivan | G06Q 30/01 |
| 10,565,317 | B1* | 2/2020 | Liu | G06F 40/56 |
| 10,573,298 | B2* | 2/2020 | Anders | G06F 40/56 |
| 10,592,609 | B1* | 3/2020 | Tucker | G06F 40/253 |
| 10,628,471 | B2* | 4/2020 | Chandramouli | G06N 3/04 |
| 10,629,191 | B1* | 4/2020 | Cheng | G06N 20/00 |
| 10,664,527 | B1* | 5/2020 | Henderson | G06F 16/3334 |
| 10,671,941 | B1* | 6/2020 | Karp | G06F 40/30 |
| 10,691,897 | B1* | 6/2020 | Rajagopal | G06F 40/247 |
| 10,720,160 | B2* | 7/2020 | Schramm | G10L 15/1815 |
| 10,721,356 | B2* | 7/2020 | Segalis | G06N 20/00 |
| 2004/0044516 | A1* | 3/2004 | Kennewick | G10L 15/22 704/5 |
| 2007/0112714 | A1* | 5/2007 | Fairweather | G06F 9/4493 706/46 |
| 2008/0109473 | A1* | 5/2008 | Dixon | H04L 63/1483 |
| 2011/0087673 | A1 | 4/2011 | Chen et al. | |
| 2011/0213642 | A1* | 9/2011 | Makar | G06F 40/30 705/7.38 |
| 2012/0041903 | A1* | 2/2012 | Beilby | H04L 51/02 706/11 |
| 2012/0245925 | A1* | 9/2012 | Guha | G06F 40/20 704/9 |
| 2012/0290950 | A1* | 11/2012 | Rapaport | H04N 21/8358 715/753 |
| 2015/0178371 | A1* | 6/2015 | Seth | G06F 40/117 707/748 |
| 2016/0012465 | A1* | 1/2016 | Sharp | G06Q 20/10 705/14.17 |
| 2016/0071517 | A1* | 3/2016 | Beaver | G10L 15/22 704/9 |
| 2016/0155442 | A1* | 6/2016 | Kannan | G10L 15/22 704/275 |
| 2016/0360466 | A1* | 12/2016 | Barak | G06Q 10/107 |
| 2017/0300831 | A1* | 10/2017 | Gelfenbeyn | G10L 15/30 |
| 2017/0358296 | A1* | 12/2017 | Segalis | H04M 3/58 |
| 2017/0366478 | A1* | 12/2017 | Mohammed | H04L 51/02 |
| 2017/0366479 | A1* | 12/2017 | Ladha | H04L 51/046 |
| 2018/0052664 | A1* | 2/2018 | Zhang | G06F 16/90332 |
| 2018/0053119 | A1* | 2/2018 | Zeng | G06N 20/00 |
| 2018/0054464 | A1* | 2/2018 | Zhang | H04L 65/1096 |
| 2018/0054523 | A1* | 2/2018 | Zhang | G06N 5/04 |
| 2018/0060303 | A1* | 3/2018 | Sarikaya | G06F 40/205 |
| 2018/0075847 | A1* | 3/2018 | Lee | G06F 16/3329 |
| 2018/0083894 | A1* | 3/2018 | Fung | H04L 51/08 |
| 2018/0083898 | A1* | 3/2018 | Pham | G06F 40/274 |
| 2018/0083901 | A1* | 3/2018 | McGregor, Jr. | G06K 9/726 |
| 2018/0089163 | A1* | 3/2018 | Ben Ami | G06N 3/08 |
| 2018/0090137 | A1* | 3/2018 | Horling | G10L 15/1815 |
| 2018/0109526 | A1* | 4/2018 | Fung | H04L 63/168 |
| 2018/0115643 | A1* | 4/2018 | Skiba | H04M 3/5141 |
| 2018/0129484 | A1* | 5/2018 | Kannan | G10L 15/1815 |
| 2018/0131642 | A1* | 5/2018 | Trufinescu | G10L 15/265 |
| 2018/0144738 | A1 | 5/2018 | Yasavur et al. | |
| 2018/0159805 | A1* | 6/2018 | Jones | H04L 51/36 |
| 2018/0210874 | A1* | 7/2018 | Fuxman | G06F 40/35 |
| 2018/0212904 | A1* | 7/2018 | Smullen | H04L 51/02 |
| 2018/0225568 | A1* | 8/2018 | Chandramouli | G06F 16/3344 |
| 2018/0253985 | A1* | 9/2018 | Aggarwal | H04L 67/306 |
| 2018/0296929 | A1* | 10/2018 | Vaccari | A63F 13/87 |
| 2018/0307678 | A1* | 10/2018 | Anantaram | G06F 40/205 |
| 2018/0307687 | A1* | 10/2018 | Natkin | G06F 16/248 |
| 2018/0357220 | A1* | 12/2018 | Galitsky | G06F 40/30 |
| 2018/0357221 | A1* | 12/2018 | Galitsky | G06F 40/205 |
| 2018/0358001 | A1* | 12/2018 | Amid | G06F 16/3329 |
| 2018/0358006 | A1* | 12/2018 | McConnell | G06F 40/35 |
| 2018/0365228 | A1* | 12/2018 | Galitsky | G06F 40/30 |
| 2018/0367483 | A1* | 12/2018 | Rodriguez | H04L 51/046 |
| 2018/0367484 | A1* | 12/2018 | Rodriguez | H04L 67/36 |
| 2018/0374479 | A1* | 12/2018 | Hall | G06F 40/56 |
| 2018/0375806 | A1* | 12/2018 | Manning | H04L 51/02 |
| 2019/0012390 | A1* | 1/2019 | Nishant | G06N 20/00 |
| 2019/0012714 | A1* | 1/2019 | Bright | G06Q 30/0617 |
| 2019/0013023 | A1* | 1/2019 | Pourmohammad | G10L 15/30 |
| 2019/0020605 | A1* | 1/2019 | Efrati | G06F 40/30 |
| 2019/0034976 | A1* | 1/2019 | Hamedi | G06Q 30/0204 |
| 2019/0042988 | A1* | 2/2019 | Brown | G06Q 10/0631 |
| 2019/0043106 | A1* | 2/2019 | Talmor | G06N 3/006 |
| 2019/0052584 | A1* | 2/2019 | Barve | H04L 51/02 |
| 2019/0089655 | A1* | 3/2019 | Uppala | H04L 67/16 |
| 2019/0103111 | A1* | 4/2019 | Tiwari | G06F 16/3334 |
| 2019/0108285 | A1* | 4/2019 | Stillwell, Jr. | G06F 16/335 |
| 2019/0108286 | A1* | 4/2019 | Pan | G06F 40/295 |
| 2019/0124020 | A1* | 4/2019 | Bobbarjung | G06Q 20/123 |
| 2019/0138595 | A1* | 5/2019 | Galitsky | G06F 40/216 |
| 2019/0147883 | A1* | 5/2019 | Mellenthin | G10L 15/265 704/275 |
| 2019/0149488 | A1* | 5/2019 | Bansal | H04L 51/02 709/206 |
| 2019/0188261 | A1* | 6/2019 | Herzig | G06F 40/35 |
| 2019/0197111 | A1* | 6/2019 | Garrote | G06F 40/30 |
| 2019/0213831 | A1* | 7/2019 | Cage | G07F 17/3223 |
| 2019/0217206 | A1* | 7/2019 | Liu | G06N 20/00 |
| 2019/0228068 | A1* | 7/2019 | Sen | G06F 40/30 |
| 2019/0258710 | A1* | 8/2019 | Biyani | G06F 40/253 |
| 2019/0259380 | A1* | 8/2019 | Biyani | G10L 15/22 |
| 2019/0272323 | A1* | 9/2019 | Galitsky | G06F 40/205 |
| 2019/0281159 | A1* | 9/2019 | Segalis | G10L 15/222 |
| 2019/0286711 | A1* | 9/2019 | Terry | G06F 40/295 |
| 2019/0286712 | A1* | 9/2019 | Terry | G06F 40/30 |
| 2019/0286713 | A1* | 9/2019 | Terry | H04L 51/02 |
| 2019/0306107 | A1* | 10/2019 | Galbraith | G06F 9/547 |
| 2019/0312827 | A1* | 10/2019 | Barve | H04L 51/02 |
| 2019/0325081 | A1* | 10/2019 | Liu | G10L 15/183 |
| 2019/0340201 | A1* | 11/2019 | Havens | G06F 40/30 |
| 2019/0347668 | A1* | 11/2019 | Williams | H04L 67/2833 |
| 2019/0361977 | A1* | 11/2019 | Crudele | G06F 40/30 |
| 2019/0370615 | A1* | 12/2019 | Murphy | G06Q 10/0633 |
| 2019/0370629 | A1* | 12/2019 | Liu | G06F 40/30 |
| 2019/0377790 | A1* | 12/2019 | Redmond | H04L 51/02 |
| 2019/0385237 | A1* | 12/2019 | Wetton | G06Q 10/067 |
| 2020/0004813 | A1* | 1/2020 | Galitsky | G06F 40/30 |
| 2020/0005118 | A1* | 1/2020 | Chen | G06N 3/0445 |
| 2020/0007380 | A1* | 1/2020 | Chen | G06F 40/232 |
| 2020/0007461 | A1* | 1/2020 | Zhang | H04L 47/783 |
| 2020/0028803 | A1* | 1/2020 | Helmy | G06N 20/00 |
| 2020/0034797 | A1* | 1/2020 | Jonnalagadda | H04L 51/02 |
| 2020/0042642 | A1* | 2/2020 | Bakis | G06F 16/951 |
| 2020/0042649 | A1* | 2/2020 | Bakis | G06F 40/30 |
| 2020/0050940 | A1* | 2/2020 | Li | G06N 3/08 |
| 2020/0065857 | A1* | 2/2020 | Lagi | G06F 16/9538 |
| 2020/0075003 | A1* | 3/2020 | Kim | H04M 3/4936 |
| 2020/0081939 | A1* | 3/2020 | Subramaniam | G06F 40/10 |
| 2020/0099633 | A1* | 3/2020 | D'Agostino | H04L 51/02 |
| 2020/0106726 | A1* | 4/2020 | Pham | H04L 51/08 |
| 2020/0117858 | A1* | 4/2020 | Freeman | G06F 40/117 |
| 2020/0125901 | A1* | 4/2020 | Pelov | H04L 51/02 |
| 2020/0175117 | A1* | 6/2020 | Tsuji | G06N 5/04 |
| 2020/0184959 | A1* | 6/2020 | Yasa | G06F 16/313 |
| 2020/0184992 | A1* | 6/2020 | Newell | G06N 5/046 |
| 2020/0227025 | A1* | 7/2020 | DiMascio | G10L 15/22 |

FOREIGN PATENT DOCUMENTS

| | | | |
|---|---|---|---|
| KR | 101851786 B1 * | 4/2018 | |
| KR | 101851789 B1 * | 4/2018 | |

(56) References Cited

FOREIGN PATENT DOCUMENTS

| KR | 101851790 B1 | * | 4/2018 |
|---|---|---|---|
| KR | 20180055680 A | * | 5/2018 |
| KR | 101851785 B1 | * | 6/2018 |
| KR | 20190059731 A | | 5/2019 |
| KR | 101971582 B1 | * | 8/2019 |

OTHER PUBLICATIONS

Aboluwarin, Pelumi, "Chatbots—Igniting Division of Labour in AI", Medium.com, Apr. 12, 2016, retrieved from: https://medium.com/@pelumi/chatbots-igniting-division-of-labour-in-ai-1430fcc85c8d, 4 pages.

Chavan, Muralidhar, IBM Blog, published Jan. 18, 2019, retrieved from: https://developer.ibm.com/patterns/compose-bots-using-an-agent-bot/, 3 pages.

Chaves; et al., "Single or Multiple Conversational Agents? An Interactional Coherence Comparison", Conference: ACM CHI Conference on Human Factors in Computing Systems (CHI 2018), Apr. 21-26, 2018, Montreal, QC, Canada, 13 pages.

Maturi, Hareesh, "Meta Chatbot: Enabling collaboration between chatbots", Linkedin.com (published Dec. 26, 2016), retrieved from: https://www.linkedin.com/pulse/meta-chatbot-enabling-collaboration-between-chatbots-hareesh-maturi/, 7 pages.

Pei; et al., "A Modular Task-oriented Dialogue System Using a Neural Mixture-of-Experts", Proceedings of the 2019 SIGIR Workshop WCIS: Workshop on Conversational Interaction Systems (submitted Jul. 10, 2019), Paris, France, arXiv:1907.05346v1 [cs.CL], 7 pages.

Subramaniam; et al., "COBOTS—A Cognitive Multi-Bot Conversational Framework for Technical Support", AAMAS 2018, Jul. 10-15, 2018, Stockholm, Sweden, pp. 597-604.

* cited by examiner

MULTI-DOMAIN CHATBOT

FIELD OF THE INVENTION

The present invention relates to the automated servicing of messages from a user, and more particularly relates to a multi-domain chatbot configured to automatically service domain-specific messages from the user.

BACKGROUND

The use of chatbots is becoming more widespread due to the increasing power of Artificial Intelligence (AI) and sophistication of natural language understanding (NLU) systems. Instead of interacting with a human agent, a user is able to interact with a chatbot to determine the amount of money in his/her bank account, another chatbot to search for available hotels, and another chatbot to receive flight status information. Discussed herein are techniques for providing increased convenience and a more streamlined experience for a user who desires to use a plurality of domain-specific chatbots.

SUMMARY OF THE INVENTION

In accordance with one embodiment of the invention, a multi-domain chatbot is used to service a message of a user. An automated agent of the multi-domain chatbot may act as an intermediary between the user and a plurality of domain-specific modules of the multi-domain chatbot. The automated agent may receive the message from the user, determine an intent of the message, and based on the intent, determine a group of the domain-specific modules that should be investigated. The automated agent may then investigate the group of domain-specific modules by sending the user message to and receiving responses from the domain-specific modules within the group. Based on the received responses, the automated agent may determine whether to provide one of the domain-specific responses to the user or a null response to the user, in the event that none of the domain-specific responses is aligned with the intent of the message.

The process to determine whether to provide one of the domain-specific responses or a null response may include determining whether any of the domain-specific responses are aligned with the intent of the message. Such determination may be based on at least one of prior interactions between the automated agent and the user or interactions between the automated agent and other users. If at least one of the domain-specific responses is aligned with the intent of the message, the domain-specific modules may be ranked based on a criterion of how likely each of the domain-specific modules will be able to satisfy the intent of the user message. The ranking of domain-specific modules may also be based on at least one of prior interactions between the automated agent and the user or interactions between the automated agent and other users. The response from the most highly ranked domain-specific module may then be transmitted to the client device.

If, however, none of the domain-specific responses is aligned with the intent of the message, a null response may be selected from a plurality of null responses based on at least one of the intent of the user message and the responses from the group of domain-specific modules. The selected null response may then be transmitted to the client device. In one embodiment, the selected null response may inform the user of one or more domain-specific modules that have been investigated and ruled out for not being able to address (or sufficiently address) the user message. In another example, the selected null response may request information from the user to clarify the intent of the user message. In additional examples, the selected null response may offer an apology to the user, state that the intent of the user message cannot be understood, transfer the user to a human agent, or direct the user to contact a human agent.

These and other embodiments of the invention are more fully described in association with the drawings below.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps.

Figure 1:
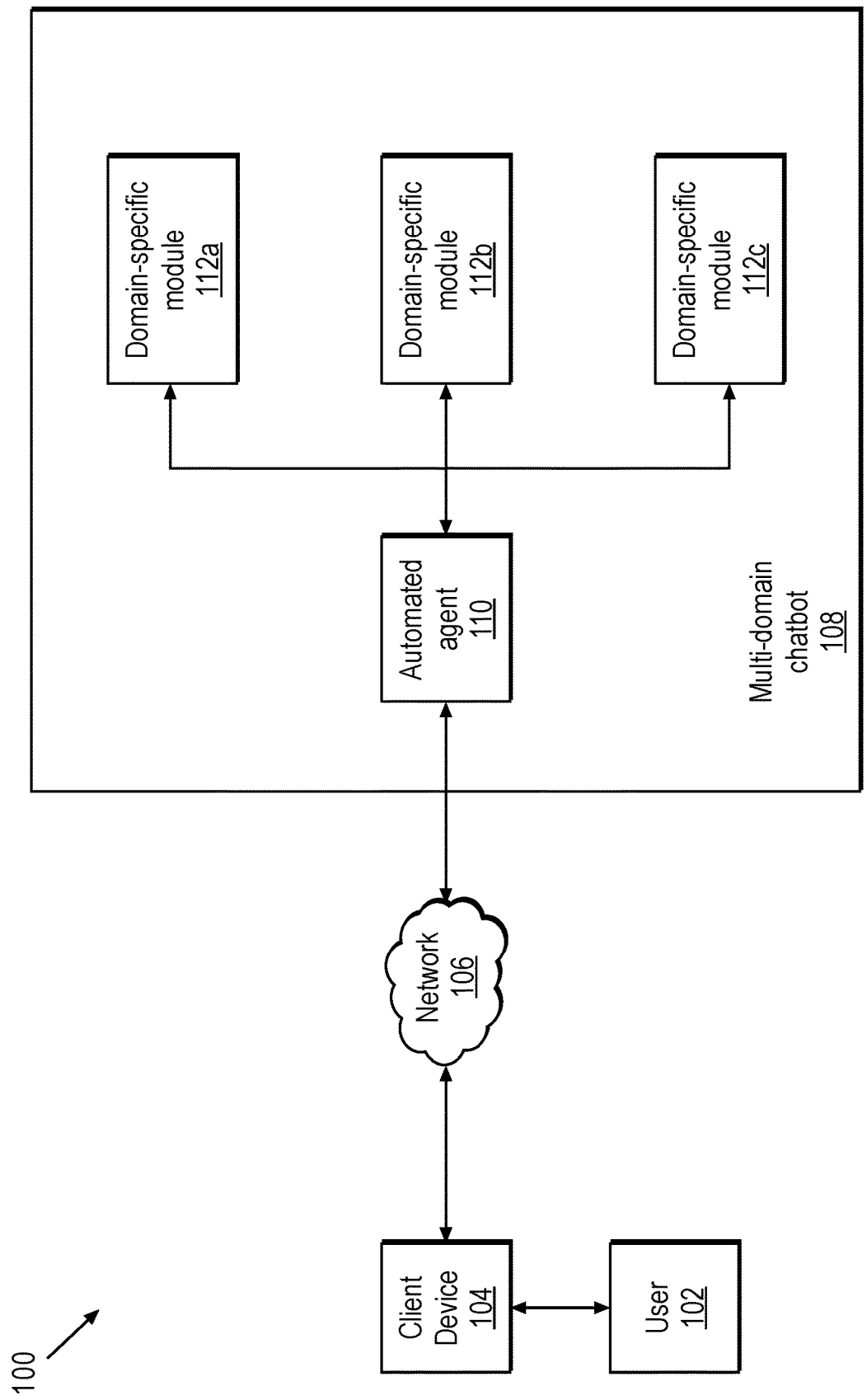
FIG. 1 depicts a system diagram with a client device communicatively coupled to a multi-domain chatbot, in accordance with one embodiment of the invention.

FIG. 1 depicts system diagram 100 with client device 104 communicatively coupled to multi-domain chatbot 108 via network 106. Network 106 may be any form of communications means and, in some cases, may be individual communications links, or one or more communications networks, including private networks, public networks and/or virtual private networks over public networks. User 102 may use client device 104 to communicate with multi-domain chatbot 108. In response to the communication from the user (which may be a question, a request or a statement), multi-domain chatbot 108 may provide an answer (e.g., an answer to the question, "How do I access my paystub?"), may perform a task (e.g., reimbursing money to a user), or in some instances, may provide a "null response" (e.g., an apology message). A null response may refer to a response that does not completely satisfy an intent of the user message.

Multi-domain chatbot 108 may include automated agent 110 that acts as an interface or intermediary between user 102 and one or more of the domain-specific modules (e.g., 112a, 112b and 112c). As an example, automated agent 110 may receive a message from user 102, and return a response to the message from the most relevant one of the domain-specific modules, or if no response from any of the domain-specific modules is suitable for responding to the message, automated agent 110 may return a null response. Specific details of the operation of multi-domain chatbot 108 will be provided below in the description of FIGS. 2-5.

In the embodiment of FIG. 1, three domain-specific modules (i.e., 112a, domain-112b and 112c) are depicted, but it is understood that two or more domain-specific modules may be present in other embodiments. A domain-specific module may generally refer to a module that is configured to communicate with user 102 regarding topics that fall within a certain domain. In some instances, a domain-specific module may be configured to provide a response to a domain-specific question (e.g., "How do I submit a reimbursement?"), whereas in other instances, a domain-specific module may be configured to perform a domain-specific task (e.g., perform the task of purchasing a laptop).

The domains serviced by the domain-specific modules may vary depending on the specific context in which multi-domain chatbot 108 is instantiated. In an enterprise context, example domains may include information technology (IT) (e.g., software support, hardware support), finance, human resources (HR), management, etc., and example domain-specific modules may include a module adapted to respond to messages regarding IT issues, a module adapted to respond to messages regarding finance issues, a module adapted to respond to messages regarding HR issues, etc. In a college context, example domains may include enrollment, athletics, fundraising, student organizations, etc. In a travel agency context, example domains may include airline, cruise, hotel, weather, excursions, marketing, tour packages, etc.

Figure 2:
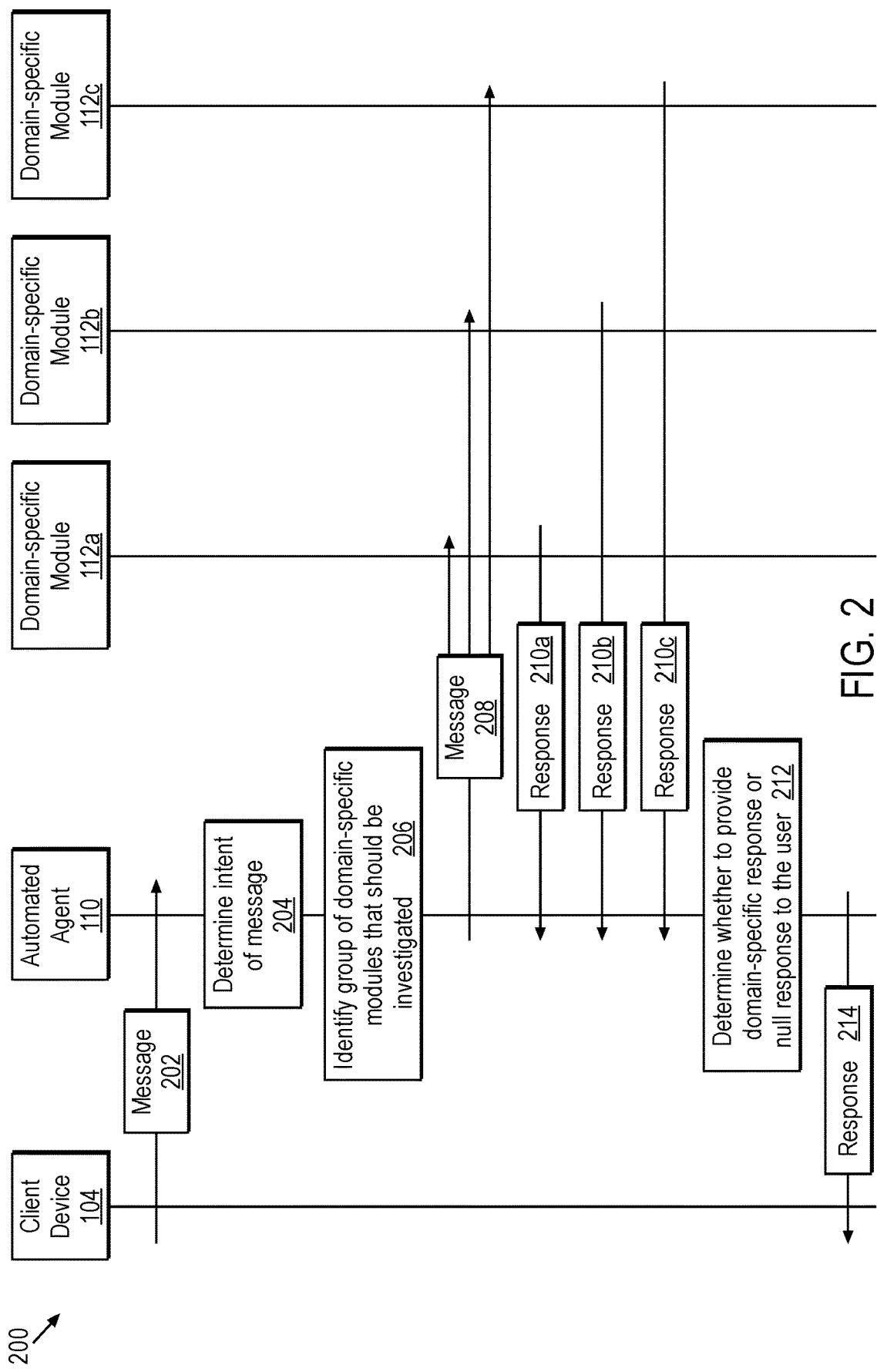
FIG. 2 depicts a sequence diagram that describes the communication between the client device and the multi-domain chatbot and the internal communication between various components of the multi-domain chatbot, in accordance with one embodiment of the invention.

FIG. 2 depicts sequence diagram 200 that describes the communication between client device 104 and multi-domain chatbot 108, and the internal communication within the various components of multi-domain chatbot 108. At step 202, client device 104 may transmit a message to automated agent 110. For example, the message may describe a problem (e.g., "I spilled coffee on my laptop"), may explicitly state a request, (e.g., "I need a new laptop"), or may implicitly state a request, (e.g., "I forgot the password to my email account"), implying that the user needs help logging into his/her email account.

At step 204, a natural language understanding (NLU) system of automated agent 110 may determine an intent of the message from client device 104. Example NLU systems include the Moveworks AI platform from Moveworks, Inc.® of Mountain View, Calif.; DialogFlow from Alphabet Inc.® of Mountain View, Calif.; and Language Understanding (LUIS) from Microsoft Corp.® of Redmond, Wash. An intent may refer to a taxonomy or class into which a message from the user may be classified. For example, all the following messages, "My laptop is not working", "My laptop has an issue", "I don't know what is wrong with my laptop" may be classified under the intent of "User has a problem with his/her laptop".

At step 206, automated agent 110 may identify a group of domain-specific modules that should be investigated based on the identified intent of the message. In one embodiment, the identified group may include at least two domain-specific modules. Such intent identification may be based on at least one of prior interactions between automated agent 110 and user 102 or interactions between automated agent 110 and other users (e.g., also called "historical data"), and the implementation of the intent identification in step 206 may involve a table look-up and/or machine learning. In a table look-up approach, a table may be used to map the intent of "User has a problem with his/her laptop" to the domain-specific module of an "IT module".

In a machine learning approach, a model (not depicted) may be used to identify one or more domain-specific modules that are suitable to address a particular intent. More specifically, during a training phase, the model may be provided with known pairings of inputs and outputs (e.g., input of "User has a problem with his/her laptop" paired with the output of "IT module"; and various other pairings) so as to tune parameters of the model. Subsequently, during a model application phase, the model (with the parameters optimized during the training phase) may be used to identify one or more domain-specific modules that are suitable to address a particular intent (e.g., determine "finance module" in response to the intent of "User needs a reimbursement").

At step 208, automated agent 110 may transmit the user message (and in some embodiments, may also transmit the identified intent) to each of the domain-specific modules identified in step 206. In the example of FIG. 2, it is assumed that automated agent 110 identified all of three domain-specific modules 112a, 112b and 112c as modules that should be investigated, and accordingly in step 208, automated agent 110 investigates each of those domain-specific modules by transmitting the user message to each of the domain-specific modules. Next, automated agent 110 may receive a response from each of the domain-specific modules (e.g., response 210a from domain-specific module 112a, response 210b from domain-specific module 112b, and response 210c from domain-specific module 112c). Examples of such responses will be provided below in the description of FIGS. 4 and 5.

At step 212, automated agent 110 may, based on responses 210a, 210b and 210c, determine whether to transmit a response from one of the domain-specific modules or a null response to the user. Additional details of step 212 will be provided below in the description of FIG. 3. Finally, at step 214, automated agent 110 may transmit the determined response to client device 104. If not already apparent, it is noted that the response transmitted in step 214 is responsive to the user's message from step 202. As explained in FIG. 3 below, such a response may be a domain-specific response or a null response.

Figure 3:
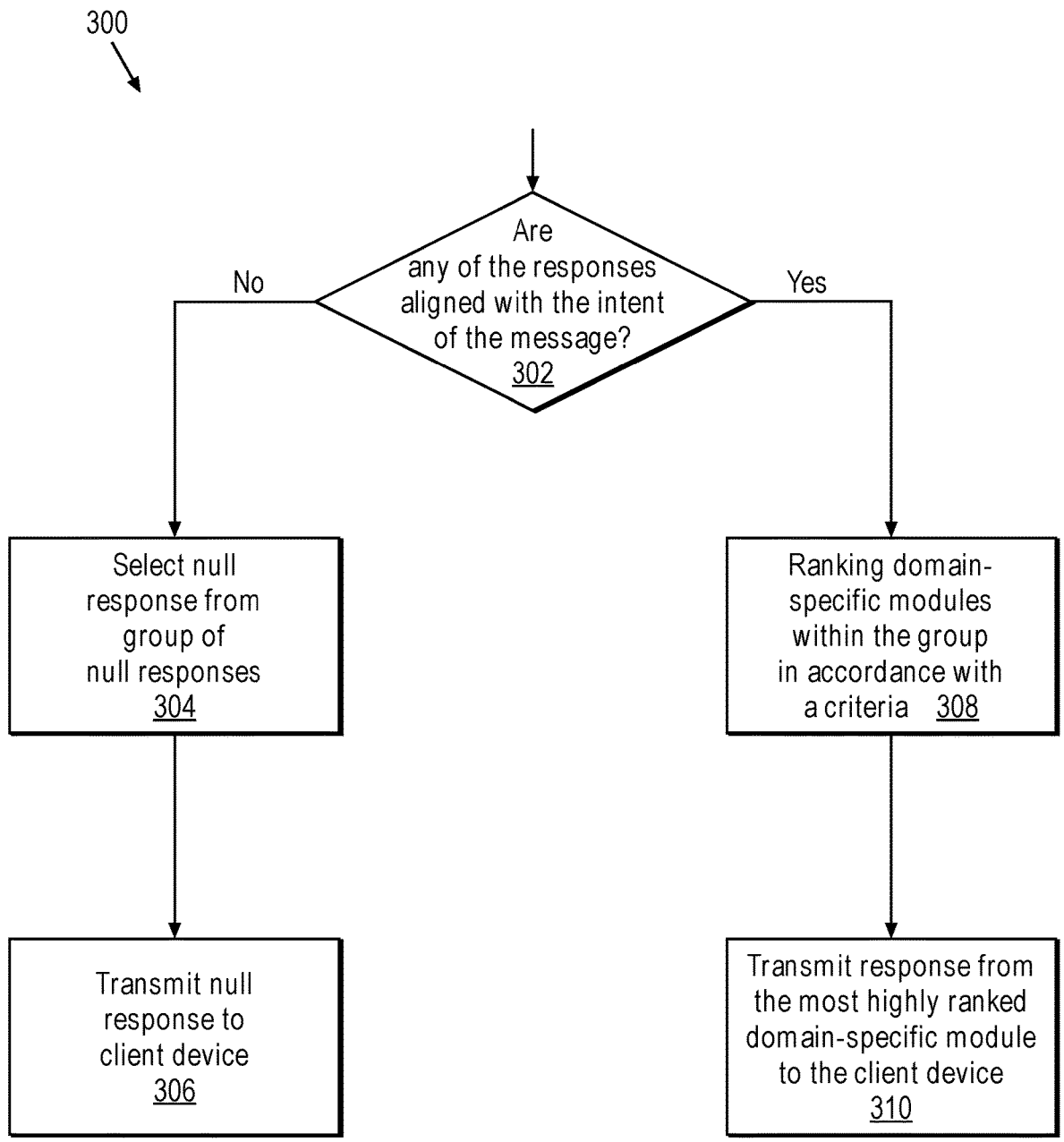
FIG. 3 depicts a flow chart of a process for determining whether to provide a domain-specific response or a null response to the user, in accordance with one embodiment of the invention.

FIG. 3 depicts flow chart 300 of a process for determining whether to provide a domain-specific response or a null response to user 102, and subsequently transmitting the determined response to user 102. At step 302, automated agent 110 may determine whether any of the domain-specific responses are aligned with the determined intent of the message. Similar to step 206, the determination of step 302 may be based on at least one of prior interactions between automated agent 110 and user 102 or interactions between automated agent 110 and other users (e.g., also called "historical data"), and the implementation of step 302 may involve a table look-up and/or machine learning. In a table look-up approach, a table may be used to determine whether a domain-specific response was previously matched with an intent of a message. If so, the response may be determined to be aligned with the intent of the message; otherwise, the response may be determined to not be aligned with the intent of the message.

In a machine learning approach, a model (not depicted) may be used to determine whether a response is aligned with an intent. More specifically, during a training phase, the model may be provided with known pairings of inputs and outputs (e.g., input of [response: "Can you send a picture of the receipt?", intent: "User needs help with a reimbursement"] paired with the output "aligned"; input of [response: "Can you send a profile picture?", intent: "User needs help with a reimbursement"] paired with the output "not aligned"; and various other pairings) so as to tune parameters of the model. Subsequently, in a model application phase, the model (with the parameters tuned during the training phase) may be used to, for example, determine whether a domain-specific response is aligned with the intent of a message.

Known pairings of inputs and outputs may be based on past interactions between multi-domain chatbot 108 and user 102. For instance, if in the past, the user message of "Can you reimburse $22.05 for the lunch I had with the client?" results in the identification of the intent of "User needs help with a reimbursement", which returns the domain-specific response of "Can you send a picture of the receipt?", and the user subsequently follows through and submits a picture of the receipt, it may be inferred from the user's follow through that the response: "Can you send a picture of the receipt?" is aligned with the intent: "User needs help with a reimbursement". On the other hand, if in the past, the user message of "Can you reimburse $22.05 for the lunch I had with the client?" results in the identification of the intent of "User needs help with a reimbursement", which returns the domain-specific response of "Can you send a profile picture?", and the user ignores this request of multi-domain agent 108, it may be inferred based on the user's inaction that the response: "Can you send a profile picture?" is not aligned with the intent: "User needs help with a reimbursement".

If automated agent 110 determines that at least one of the domain-specific responses is aligned with the intent of the message, the process may proceed to step 308 (take "Yes" branch of step 302), in which automated agent 110 may rank the domain-specific modules within the group in accordance with a criterion. In one embodiment, the ranking of the domain-specific modules may take into account at least one of prior interactions between automated agent 110 and user 102 or interactions between automated agent 110 and other users (e.g., also known as "historical data"). Further, the criterion to rank the domain-specific responses may consider how likely each of the domain-specific modules will be able to satisfy the intent of the user message. At step 310, the response from the most highly ranked domain-specific module may be transmitted to client device 104.

If, on the other hand, automated agent 110 determines that none of the domain-specific responses is aligned with the intent of the message, the process may proceed to step 304 (take "No" branch of step 302), in which automated agent 110 may select a null response from a group of null responses based on at least one of the intent of the user message and the responses from the group of domain-specific modules. In one example, the selected null response may inform the user of one or more domain-specific modules that have been investigated and ruled out for not being able to address (or sufficiently address) the user message. In another example, the selected null response may request information from the user to clarify the intent of the user message. In additional examples, the selected null response may offer an apology to the user, state that the intent of the user message cannot be understood, transfer the user to a human agent, or direct the user to contact a human agent. At step 306, automated agent 110 may transmit the null response to client device 104.

Figure 4:
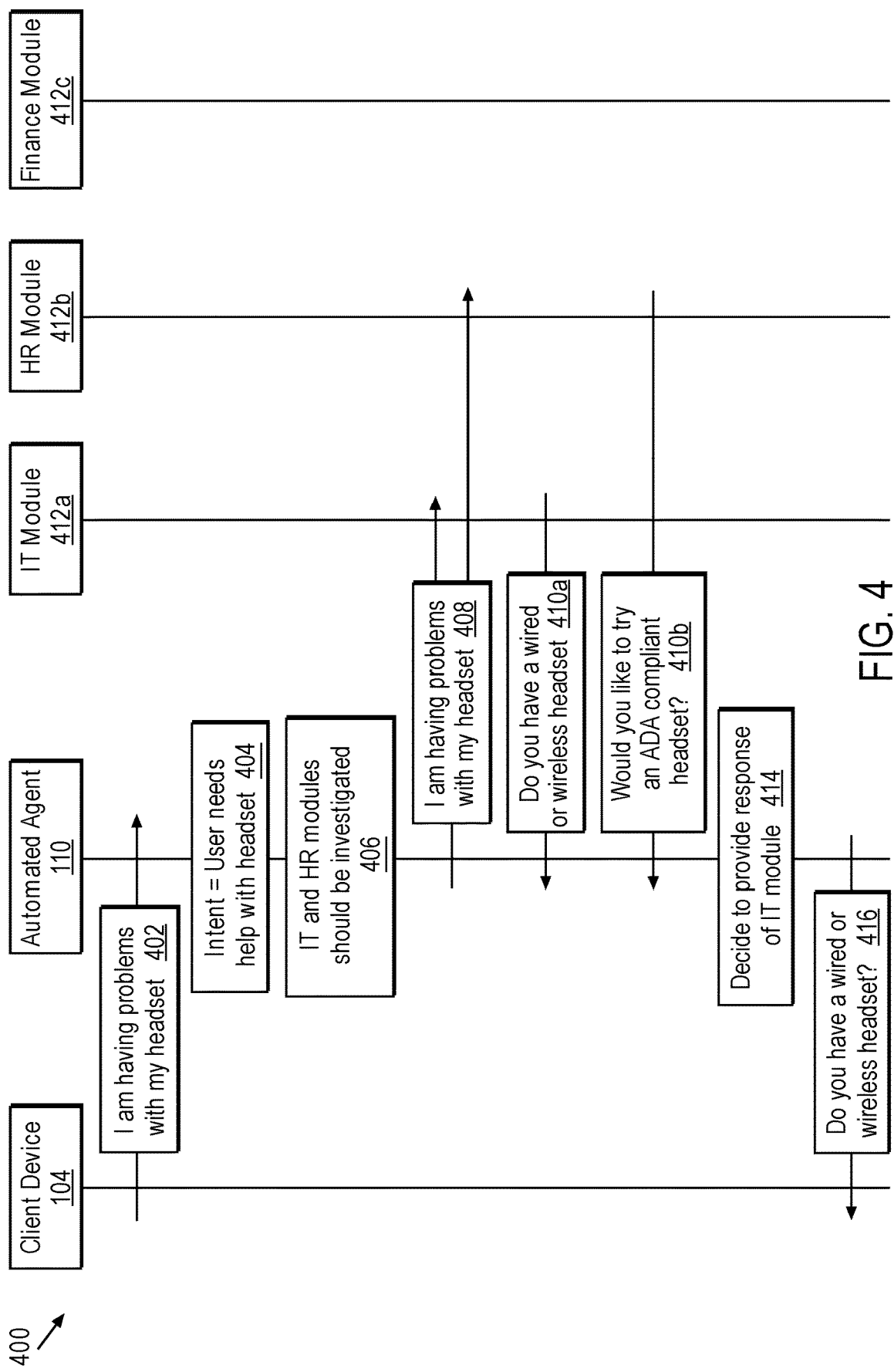
FIG. 4 depicts a sequence diagram of example communication between the client device and the multi-domain chatbot and example communication between various components of the multi-domain chatbot, in accordance with one embodiment of the invention.

FIG. 4 depicts sequence diagram 400 with example communication between client device 104 and multi-domain chatbot 108 and example internal communication between various components of multi-domain chatbot 108. At step 402, user 102 may use client device 104 to transmit the message "I am having problems with my headset" to multi-domain chatbot 108, and such message may be received by automated agent 110 of multi-domain chatbot 108. At step 404, automated agent 110 may determine the intent of the message to be "the user needs help with his/her headset". At step 406, automated agent 110 may determine, based on the intent, that IT module 412a and HR module 412b should be investigated. At step 408, automated agent 110 may transmit the user message to IT module 412a and HR module 412b. Automated agent 110 may then receive responses from the domain-specific modules that have been queried. For example, automated agent 110 may receive the message, "Do you have a wired or wireless headset?" from IT module 412a (step 410a), and the message, "Would you like to try an (American with Disabilities Act) ADA compliant headset?" from HR module 412b (step 410b). At step 414, automated agent 110 may determine whether any of the domain-specific responses is aligned with the intent of the message. In the present example, both of the domain-specific responses may be determined to be aligned with the intent, and during a subsequent ranking of the domain-specific modules, IT module 412a may be ranked higher than HR module 412b. Accordingly, in step 416, the response of the IT module, "Do you have a wired or wireless headset?" may be transmitted to client device 104. Importantly, it is noted that much if not all the internal communication within multi-domain 108 may be transparent to user 102. User 102 may only receive "Do you have a wired or wireless headset?" in response to his/her message of "I am having problems with my headset".

One motivation for using automated agent 110 as an intermediary between user 102 and the domain-specific modules is to eliminate and/or reduce the "back-and-forth" communication that might need to take place in order for user 102 to determine the domain-specific module that is the most suitable for responding to his/her message. Instead, this "back-and-forth" communication to explore the domain-specific modules may be off-loaded to automated agent 110, lessening the burden on the user to explore the domain-specific modules. In some instances, however, automated agent 110 may not be able to confidently determine a domain-specific module that is best suited to service the message of user 102, and some "back-and-forth" communication between user 102 and multi-domain chatbot 108 may still be necessary in order to select one (or more) of the domain-specific modules to service the message of user 102.

Figure 5:
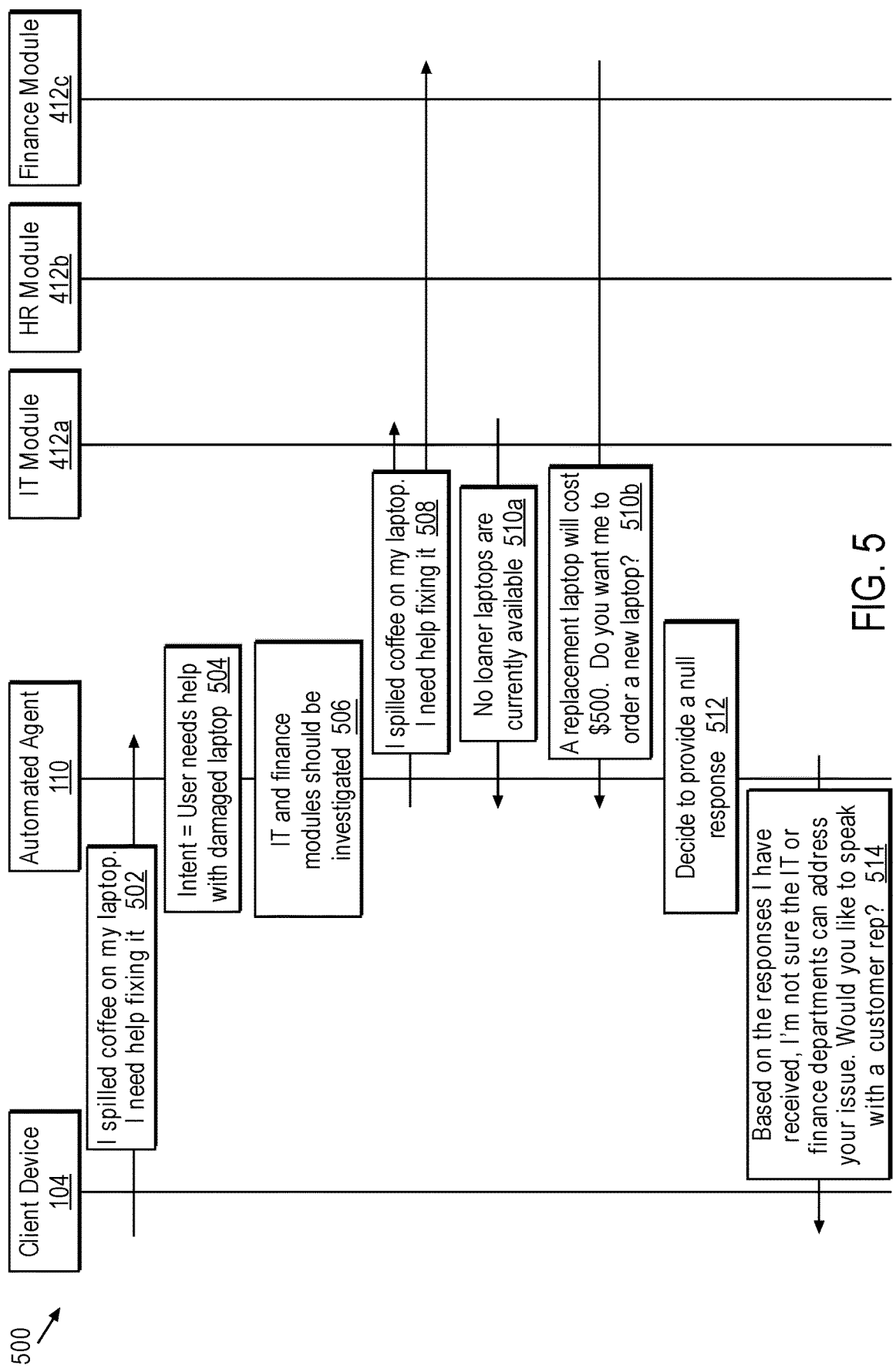
FIG. 5 depicts a sequence diagram of another example of communication between the client device and the multi-domain chatbot and communication between various components of the multi-domain chatbot, in accordance with one embodiment of the invention.

FIG. 5 depicts sequence diagram 500 with example communication between client device 104 and multi-domain chatbot 108 and example internal communication between various components of multi-domain chatbot 108. At step 502, user 102 may use client device 104 to transmit the message "I spilled coffee on my laptop. I need help fixing it." to multi-domain chatbot 108, and such message may be received by automated agent 110 of multi-domain chatbot 108. At step 504, automated agent 110 may determine the intent of the message to be "the user needs help with a damaged laptop". At step 506, automated agent 110 may determine, based on the intent, that IT module 412a and finance module 412c should be investigated. At step 508, automated agent 110 may transmit the user message to IT module 412a and finance module 412c. Automated agent 110 may then receive responses from the domain-specific modules that have been queried. For example, automated agent 110 may receive the message, "No loaner laptops are currently available" from IT module 412a (step 510a), and the message, "A replacement laptop will cost $500. Do you want me to order a new laptop?" from finance module 412c (step 510b).

At step 512, automated agent 110 may determine whether any of the domain-specific responses is aligned with the intent of the message. In the example of FIG. 5, automated agent 110 may determine that none of the domain-specific responses is aligned with the intent of the message, as they do not specifically address how to repair a damaged laptop. Accordingly, automated agent 110, at step 512, may decide to provide a null response. At step 514, automated agent 110 may transmit a null response to client device 104 that informs the user of one or more domain-specific modules that have been investigated and ruled out for not being able to address (or sufficiently address) the user message. Specifically, the null response may state, "Based on the responses I have received, I'm not sure the IT or finance departments can address your issue. Would you like to speak with a customer representative?"

As illustrated in the present example, even though multi-domain chatbot 108 was unable to directly service the message of user 102, the user may be able to still acquire useful information from multi-domain chatbot 108, in the form of which domains (and/or departments) were already searched and ruled out. Such information can then be used by user to focus his/her attention on other, more promising domains that can possibly address the outstanding problem or issue.

Figure 6:
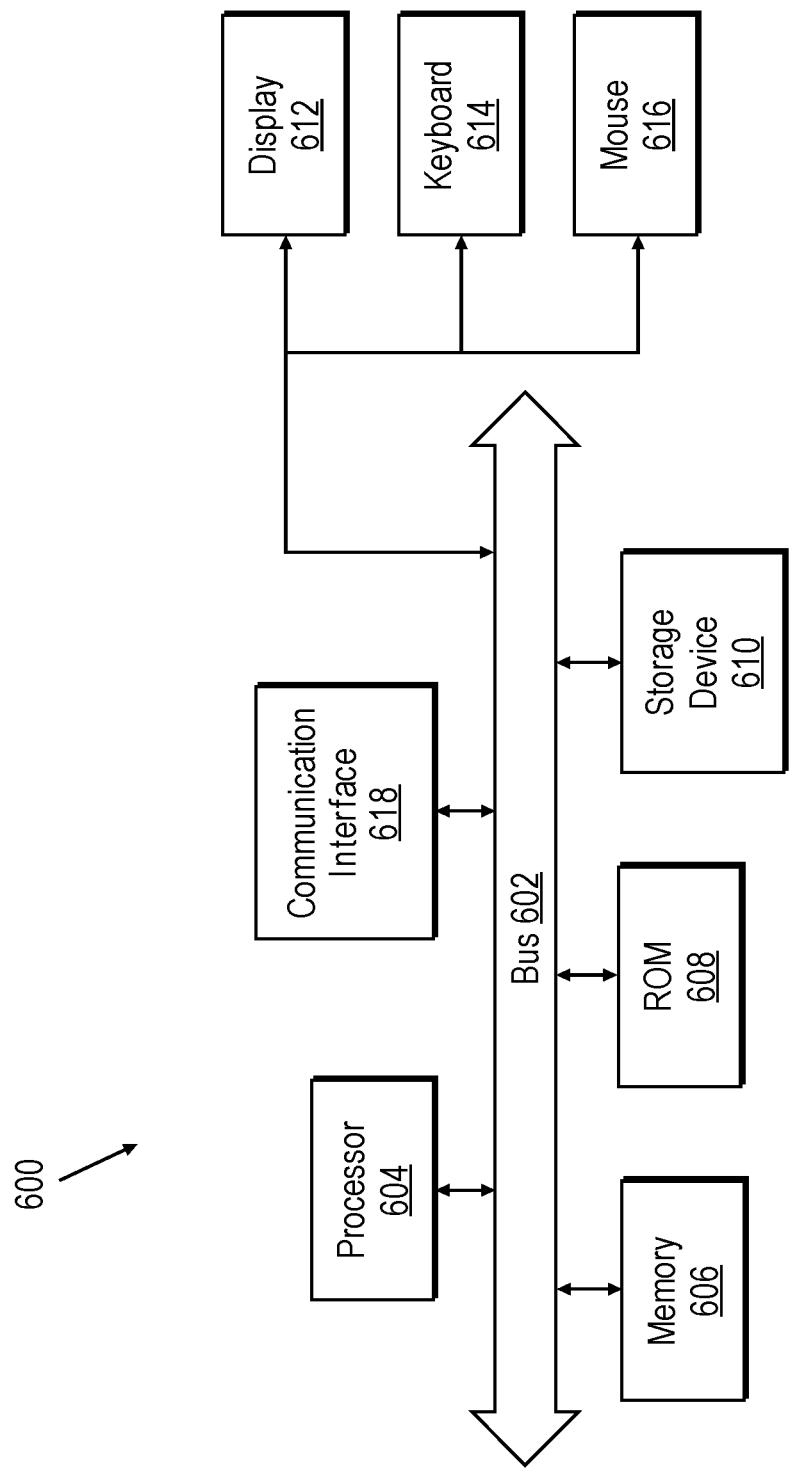
FIG. 6 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 6 provides an example of a system 600 that may be representative of any of the computing systems (e.g., client device 104, multi-domain chatbot 108) discussed herein. Examples of system 600 may include a smartphone, a desktop, a laptop, a mainframe computer, an embedded system, etc. Note, not all of the various computer systems have all of the features of system 600. For example, certain ones of the computer systems discussed above may not include a display inasmuch as the display function may be provided by a client computer communicatively coupled to the computer system or a display function may be unnecessary. Such details are not critical to the present invention.

System 600 includes a bus 602 or other communication mechanism for communicating information, and a processor 604 coupled with the bus 602 for processing information. Computer system 600 also includes a main memory 606, such as a random access memory (RAM) or other dynamic storage device, coupled to the bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to the bus 602 for storing static information and instructions for the processor 604. A storage device 610, for example a hard disk, flash memory-based storage medium, or other storage medium from which processor 604 can read, is provided and coupled to the bus 602 for storing information and instructions (e.g., operating systems, applications programs and the like).

Computer system 600 may be coupled via the bus 602 to a display 612, such as a flat panel display, for displaying information to a computer user. An input device 614, such as a keyboard including alphanumeric and other keys, may be coupled to the bus 602 for communicating information and command selections to the processor 604. Another type of user input device is cursor control device 616, such as a mouse, a trackpad, or similar input device for communicating direction information and command selections to processor 604 and for controlling cursor movement on the display 612. Other user interface devices, such as microphones, speakers, etc. are not shown in detail but may be involved with the receipt of user input and/or presentation of output.

The processes referred to herein may be implemented by processor 604 executing appropriate sequences of computer-readable instructions contained in main memory 606. Such instructions may be read into main memory 606 from another computer-readable medium, such as storage device 610, and execution of the sequences of instructions contained in the main memory 606 causes the processor 604 to perform the associated actions. In alternative embodiments, hard-wired circuitry or firmware-controlled processing units may be used in place of or in combination with processor 604 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 600 or similar electronic computing device, that manipulates and transforms data represented as physical (electronic) quantities within its registers and memories into other data similarly represented as physical quantities within its memories or registers or other such information storage, transmission or display devices.

Computer system 600 also includes a communication interface 618 coupled to the bus 602. Communication interface 618 may provide a two-way data communication channel with a computer network, which provides connectivity to and among the various computer systems discussed above. For example, communication interface 618 may be a local area network (LAN) card to provide a data communication connection to a compatible LAN, which itself is communicatively coupled to the Internet through one or more Internet service provider networks. The precise details of such communication paths are not critical to the present invention. What is important is that computer system 600 can send and receive messages and data through the communication interface 618 and in that way communicate with hosts accessible via the Internet. It is noted that the components of system 600 may be located in a single device or located in a plurality of physically and/or geographically distributed devices.

Thus, a multi-domain chatbot has been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method, comprising:
receiving, by an automated agent and from a client device, a message generated by a user;
determining, by the automated agent, an intent of the user message;
prior to transmitting the user message to any domain-specific modules, identifying a group of the domain-specific modules that should be investigated based on at least the intent of the user message, the group of domain-specific modules including at least two domain-specific modules;
transmitting the user message to the group of domain-specific modules;
receiving, by the automated agent, responses from the group of domain-specific modules;
determining whether any of the responses is aligned with the intent of the user message; and
if at least one of the responses is aligned with the intent of the user message, ranking the domain-specific modules according to a criterion, and transmitting a response from the most highly ranked domain-specific module to the client device;
otherwise, if none of the responses is aligned with the intent of the user message, transmitting, to the client device, a null response that does not satisfy the intent of the user message,
wherein the null response informs the user of one or more domain-specific modules from the group of domain-specific modules that have been investigated and ruled out for not being able to sufficiently address the user message, and further informs the user that the ruling out of the one or more domain-specific modules is based on responses the automated agent has received from the one or more domain-specific modules that have been investigated and ruled out.

2. The method of claim 1, wherein the domain-specific modules that should be investigated are configured to perform one or more tasks.

3. The method of claim 1, wherein the identification of the group of the domain-specific modules is further based on at least one of prior interactions between the automated agent and the user or interactions between the automated agent and other users.

4. The method of claim 1, wherein the determination of whether any of the responses is aligned with the intent of the user message is based on at least one of prior interactions between the automated agent and the user or interactions between the automated agent and other users.

5. The method of claim 1, wherein the ranking of the domain-specific modules takes into account at least one of prior interactions between the automated agent and the user or interactions between the automated agent and other users.

6. The method of claim 1, wherein the criterion considers how likely each of the domain-specific modules will be able to satisfy the intent of the user message.

7. The method of claim 1, wherein the null response, at least one of, offers an apology to the user, states that the intent of the user message cannot be understood, transfers the user to a human agent, or directs the user to contact a human agent.

8. The method of claim 1, wherein the null response requests information from the user to clarify the intent of the user message.

9. The method of claim 1, wherein the null response is chosen from a plurality of null responses based on at least one of the intent of the user message and the responses from the group of domain-specific modules.

10. A computing system comprising a processor and memory storing instructions that, when executed by the processor, cause the processor to:
receive, from a client device, a message generated by a user;
determine an intent of the user message;
prior to transmitting the user message to any domain-specific modules, identify a group of the domain-specific modules that should be investigated based on at least the intent of the user message, the group of domain-specific modules including at least two domain-specific modules;
transmit the user message to the group of domain-specific modules;
receive responses from the group of domain-specific modules;
determine whether any of the responses is aligned with the intent of the user message; and
if at least one of the responses is aligned with the intent of the user message, rank the domain-specific modules according to a criterion, and transmit a first response from the most highly ranked domain-specific module to the client device;
otherwise, if none of the responses is aligned with the intent of the user message, transmit, to the client device, a null response that does not satisfy the intent of the user message,
wherein the null response informs the user of one or more domain-specific modules from the group of domain-specific modules that have been investigated and ruled out by an automated agent for not being able to sufficiently address the user message, and further informs the user that the ruling out of the one or more domain-specific modules is based on responses the automated agent has received from the one or more domain-specific modules that have been investigated and ruled out.

11. The computing system of claim 10, wherein the ranking of the domain-specific modules takes into account at least one of prior interactions between the automated agent and the user or interactions between the automated agent and other users.

12. The computing system of claim 10, wherein the domain-specific modules that should be investigated are configured to perform one or more tasks.

13. The computing system of claim 10, wherein the identification of the group of the domain-specific modules is further based on at least one of prior interactions between the automated agent and the user or interactions between the automated agent and other users.

14. The computing system of claim 10, wherein the determination of whether any of the responses is aligned with the intent of the user message is based on at least one of prior interactions between the automated agent and the user or interactions between the automated agent and other users.

15. A non-transitory machine-readable storage medium comprising instructions that, when executed by a processor, cause the processor to:

receive, from a client device, a message generated by a user;

determine an intent of the user message;

prior to transmitting the user message to any domain-specific modules, identify a group of the domain-specific modules that should be investigated based on at least the intent of the user message, the group of domain-specific modules including at least two domain-specific modules;

transmit the user message to the group of domain-specific modules;

receive responses from the group of domain-specific modules;

determine whether any of the responses is aligned with the intent of the user message; and if at least one of the responses is aligned with the intent of the user message, rank the domain-specific modules according to a criterion, and transmit a first response from the most highly ranked domain-specific module to the client device;

otherwise, if none of the responses is aligned with the intent of the user message, transmit, to the client device, a null response that does not satisfy the intent of the user message, wherein the null response informs the user of one or more domain-specific modules from the group of domain-specific modules that have been investigated and ruled out by an automated agent for not being able to sufficiently address the user message, and further informs the user that the ruling out of the one or more domain-specific modules is based on responses the automated agent has received from the one or more domain-specific modules that have been investigated and ruled out.

16. The non-transitory machine-readable storage medium of claim 15, wherein the ranking of the domain-specific modules takes into account at least one of prior interactions between the automated agent and the user or interactions between the automated agent and other users.

17. The non-transitory machine-readable storage medium of claim 15, wherein the domain-specific modules that should be investigated are configured to perform one or more tasks.

18. The non-transitory machine-readable storage medium of claim 15, wherein the identification of the group of the domain-specific modules is further based on at least one of prior interactions between the automated agent and the user or interactions between the automated agent and other users.

19. The non-transitory machine-readable storage medium of claim 15, wherein the determination of whether any of the responses is aligned with the intent of the user message is based on at least one of prior interactions between the automated agent and the user or interactions between the automated agent and other users.

* * * * *